(12) United States Patent
Choi et al.

(10) Patent No.: US 8,472,426 B2
(45) Date of Patent: Jun. 25, 2013

(54) REAL-TIME WIRELESS COMMUNICATION METHOD FOR GUARANTEEING QUALITY OF SERVICE IN WIRELESS PERSONAL AREA NETWORK

(75) Inventors: Eun-chang Choi, Daejeon-si (KR); Moo-ho Cho, Gyeongju-si (KR); Jae-doo Huh, Daejeon-si (KR); Kwang-roh Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 830 days.

(21) Appl. No.: 12/609,159

(22) Filed: Oct. 30, 2009

(65) Prior Publication Data

US 2010/0265923 A1    Oct. 21, 2010

(30) Foreign Application Priority Data

Apr. 20, 2009    (KR) .................. 10-2009-0034335

(51) Int. Cl.
*H04J 3/00*    (2006.01)
(52) U.S. Cl.
USPC ............ 370/345; 370/329; 370/341; 370/458
(58) Field of Classification Search
USPC ............ 370/329, 338, 347, 376, 341, 345, 370/458; 455/423
See application file for complete search history.

(56) References Cited

U.S. PATENT DOCUMENTS

| | | | |
|---|---|---|---|
| 6,587,453 B1 * | 7/2003 | Romans et al. | 370/347 |
| 7,616,602 B2 | 11/2009 | Choi et al. | |
| 7,684,380 B2 | 3/2010 | Odman | |
| 2003/0003905 A1 * | 1/2003 | Shvodian | 455/423 |
| 2004/0032853 A1 * | 2/2004 | D'Amico et al. | 370/349 |
| 2005/0063372 A1 | 3/2005 | Jeong et al. | |
| 2005/0141451 A1 | 6/2005 | Yoon et al. | |
| 2006/0077930 A1 * | 4/2006 | Kim et al. | 370/329 |
| 2009/0238160 A1 * | 9/2009 | Bhatti et al. | 370/338 |

FOREIGN PATENT DOCUMENTS

| | | |
|---|---|---|
| KR | 10-2004-0071332 | 8/2004 |
| KR | 10-2005-0003575 | 1/2005 |
| KR | 10-2005-0087674 | 8/2005 |
| KR | 10-2006-0108573 | 10/2006 |
| KR | 10-2006-0111318 | 10/2006 |

* cited by examiner

*Primary Examiner* — Hassan Kizou
*Assistant Examiner* — Toan Nguyen
(74) *Attorney, Agent, or Firm* — Staas & Halsey LLP

(57) ABSTRACT

Provided is a real-time wireless communication method for guaranteeing quality of service in a wireless personal area network (WPAN). When real-time data transmitted in a time slot of a current superframe has an error, a terminal, which was designated as a coordinator from among a plurality of terminals in a WPAN, allocates a time slot for retransmitting the real-time data to a next superframe and retransmits the real-time data in the allocated time slot of the next superframe. Therefore, quality of a real-time communication service in a WPAN can be guaranteed.

20 Claims, 9 Drawing Sheets

REAL-TIME WIRELESS COMMUNICATION METHOD FOR GUARANTEEING QUALITY OF SERVICE IN WIRELESS PERSONAL AREA NETWORK

CROSS-REFERENCE TO RELATED APPLICATION

This application claims the benefit under 35 U.S.C. §119 (a) of Korean Patent Application No. 10-2009-0034335, filed on Apr. 20, 2009, the disclosure of which is incorporated by reference in its entirety for all purposes.

BACKGROUND

1. Field

The following description relates to a wireless personal area network (WPAN), and more particularly, to a technology for guaranteeing quality of a real-time communication service in a WPAN environment.

2. Description of the Related Art

A wireless personal area network (WPAN) is a wireless version of a conventional personal area network (PAN). In contrast to a local area network (LAN) and a wide area network (WAN) that are widely known, a PAN is a network owned by an individual. That is, devices owned by an individual are interconnected to construct a network for convenience of the individual.

In an effort to implement PANs in a wireless manner, the Institute of Electrical and Electronics Engineers (IEEE) 802.15 working group established WPAN as the short-range wireless network standard. The IEEE 802.15 working group has four task groups. Specifically, IEEE 802.15.1 standardizes Bluetooth, and IEEE 802.15.3 and IEEE 802.15.3a standardize a high-rate WPAN. In addition, IEEE 802.15.4, called ZigBee, standardizes a low-rate WPAN which supports data rates of less than 20 Kbps.

SUMMARY

It is an objective of the present invention to enhance quality of a real-time communication service in a wireless personal area network (WPAN).

According to an exemplary aspect, there is provided a real-time wireless communication method used by a terminal, which is designated as being a coordinator from among a plurality of terminals in a WPAN, the method to guarantee quality of service. The method includes: a first superframe communication operation of allocating a first time slot for real-time wireless communication with at least one of the terminals to a first superframe, inserting information about the first time slot into a beacon and broadcasting the beacon, and exchanging data with the terminals in the first time slot of the first superframe; and a second superframe communication operation of allocating a first time slot to a second superframe which is successive to the first superframe, additionally allocating, when data transmitted or received in the first time slot of the first superframe has an error, a second time slot to the second superframe so as to retransmit or re-receive the data having the error, inserting information about the first time slot and the second time slot into a beacon and broadcasting the beacon, and retransmitting or re-receiving the data having the error in the second time slot of the second superframe.

According to another exemplary aspect, there is provided a real-time wireless communication method used by any one of a plurality of terminals in a WPAN, which is not designated as being a coordinator, the method to guarantee quality of service. The method includes: a first superframe communication operation of exchanging real-time data with the coordinator in a first time slot which was allocated by the coordinator to a first superframe; and a second superframe communication operation of, when real-time data transmitted or received in the first time slot of the first superframe has an error, retransmitting or re-receiving the real-time data having the error in a second time slot which was additionally allocated by the coordinator to a second superframe that is successive to the first superframe.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

DETAILED DESCRIPTION

The above and other features and advantages of the present invention will become more apparent by describing exemplary embodiments thereof with reference to the attached drawings. Exemplary embodiments of the present invention will now be described in detail so that they can be readily understood and applied by those skilled in the art.

Figure 1:
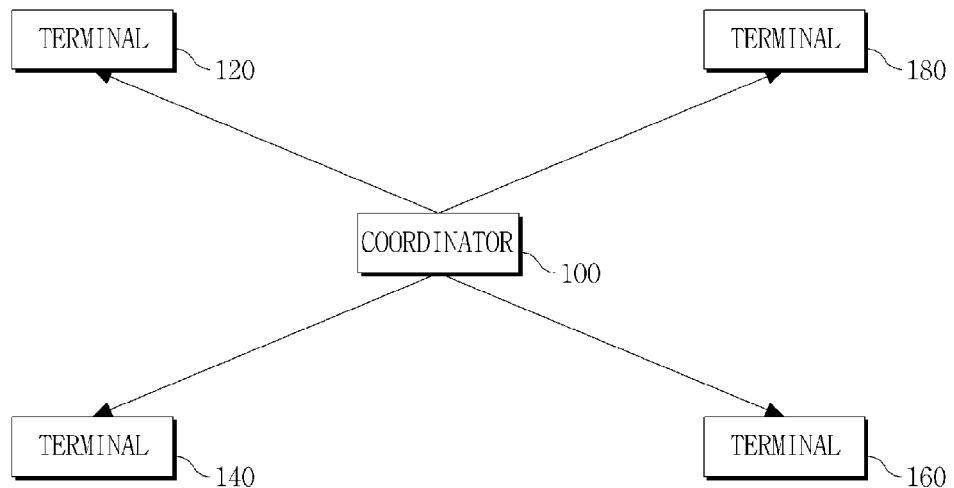
FIG. 1 illustrates the structure of a wireless personal area network (WPAN)

FIG. 1 illustrates the structure of a wireless personal area network (WPAN). Referring to FIG. 1, a plurality of terminals 100, 120, 140, 160 and 180 form one WPAN, and any one of the terminals 100, 120, 140, 160 and 180 is designated as a coordinator terminal (hereinafter, referred to as a "coordinator" for convenience). The terminal 100 designated as a coordinator in FIG. 1 broadcasts a beacon, which is a synchronization signal, to the other terminals 120, 140, 160 and 180, thereby synchronizing the terminals 120, 140, 160 and 180 connected to the WPAN.

Figure 2:
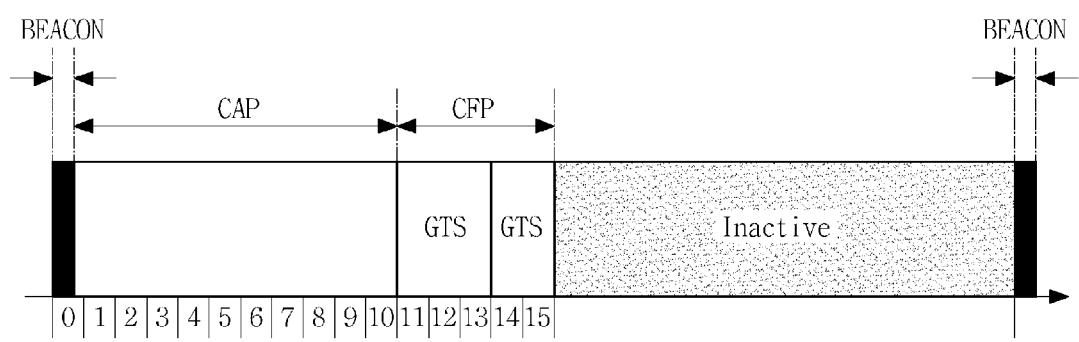
FIG. 2 illustrates the structure of a superframe used for wireless communication in a WPAN environment based on the Institute of Electrical and Electronics Engineers (IEEE) 802.15.4 standard.

FIG. 2 illustrates the structure of a superframe used for wireless communication in a WPAN environment based on the Institute of Electrical and Electronics Engineers (IEEE) 802.15.4 standard.

In the WPAN based on the IEEE 802.15.4 standard, otherwise known as ZigBee, a superframe mode may be selectively used. In the superframe mode, a coordinator broadcasts a beacon at predetermined intervals. For data exchange between a coordinator (e.g., the terminal 100 in FIG. 1) and adjacent terminals (e.g., the terminals 120, 140, 160 and 180 in FIG. 1), a superframe defined in the ZigBee standard is used. In particular, a guaranteed time slot (GTS) superframe utilizing time slots may be used to minimize the standby time of terminals and thus reduce power consumption thereof. A superframe consists of 16 time slots and is transmitted from a coordinator to adjacent terminals.

In a superframe, frames exchanged between a coordinator and adjacent terminals in designated time slots are called information frames. Examples of the information frames include a beacon frame, a data frame, an acknowledge frame, and a command frame. Referring to FIG. 2, a minimum length of a superframe is 15.36 ms, and at least 220 bytes must always be secured for a contention access period (CAP) called a contention period. In addition, a maximum of seven GTSs may be allocated to a contention free period (CFP) called a dedicated is transmission period that is allocated without contention. A GTS consists of one or more time slots.

Figure 3:
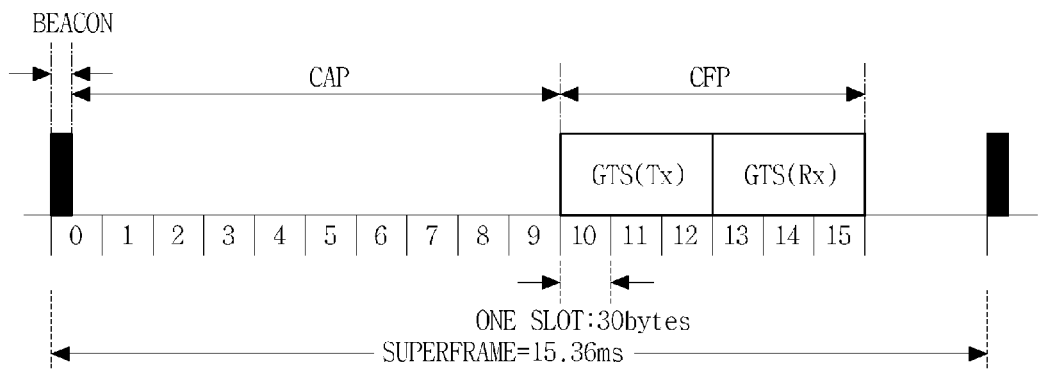
FIG. 3 illustrates the time slot structure of a ZigBee superframe for real-time data communication such as 32 Kbps voice communication.

FIG. 3 illustrates the time slot structure of a ZigBee superframe for real-time data communication such as 32 Kbps voice communication.

For voice communication, the length of a superframe is set to 15.36 ms which is a minimum superframe length. According to the ZigBee standard, the length of a superframe can be changed using 15.36 ms×$2^n$ (n=0, 1, 2, , , ). However, the length of the superframe is set to 15.36 ms (when n=0), considering that a long superframe causes delays during voice communication. For delivery of a voice signal, two GTSs are allocated to a CFP, and three time slots are allocated to each GTS. When one time slot is 30 bytes long, information of 90 bytes can be transmitted in one GTS. In addition, a voice signal coded at 32 Kbps provides data of approximately 62 bytes in a duration of 15.36 ms. Therefore, 62-byte voice data can be transmitted or received during one GTS. In this case, however, when transmitted data is damaged due to, e.g., a channel error, it cannot be transmitted again. Thus, quality of service cannot be guaranteed.

Figure 4:
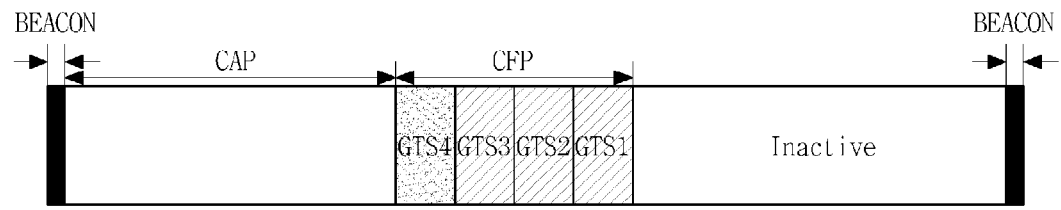
FIG. 4 illustrates the time slot structure of a ZigBee superframe for real-time data communication according to an exemplary embodiment.

FIG. 4 illustrates the time slot structure of a ZigBee superframe for real-time data communication according to an exemplary embodiment.

For one real-time data communication service, a first time slot, which includes GTS1 through GTS3, and a second time slot, which includes GTS4, are allocated to a CFP. GTS4 of the second time slot is a retransmission time slot for any one of GTS1 through GTS3 in which an error occurred during data communication in a superframe immediately before a current superframe.

For example, when an error occurs in data transmitted using GTS1 in a current superframe, the data having the error is transmitted again using GTS4 in a superframe immediately after the current superframe. In addition, for data retransmission, an is acknowledgement (ACK) or a negative acknowledgement (NACK)) is received after each frame is transmitted. Therefore, when transmitted data is erroneous, it is retransmitted not in a current frame (hereinafter, referred to as a "first superframe") but in a next frame (hereinafter, referred to as a "second superframe"). This ensures time diversity and thus increases resistance to channel errors.

In this case, a time delay of e.g., 15.36 ms is unavoidable. However, such a time delay is an allowable level in a voice service. A frame error rate is generally around 10% in the WPAN, and a frame error rate for achieving toll quality of a wireless telephone is around 2% in a voice service. Considering these facts, it cannot be expected that quality of a voice service will be guaranteed when the voice service is provided without using an ACK in the WPAN. Hence, data is retransmitted based on an ACK in order to guarantee the quality of the voice service.

According to the IEEE 802.15.4 standard, when GTS4 is additionally allocated, only a unidirectional service can be provided for 32 Kbps voice data for the following reasons. First, if the superframe structure of the IEEE 802.15.4 standard is followed as it is, three 30-byte GTSs (a total of 90 bytes) are required to transmit 32 Kbps voice data. In this case, if no ACK is used, the 32 Kbps voice data can be transmitted bi-directionally. However, if an ACK is used, the 32 Kbps voice data can only be transmitted unidirectionally since 37 bytes are additionally required for the ACK.

$t_{ack}$(12symbol=6byte)+ACK(11byte)+LIFS (40symbol=20byte)

In addition, when an error occurs after data was transmitted, there is not enough time to receive an instruction to retransmit the data at an upper layer, that is, to allocate a GTS at a media access control (MAC) layer and then retransmit the data.

Figure 5:
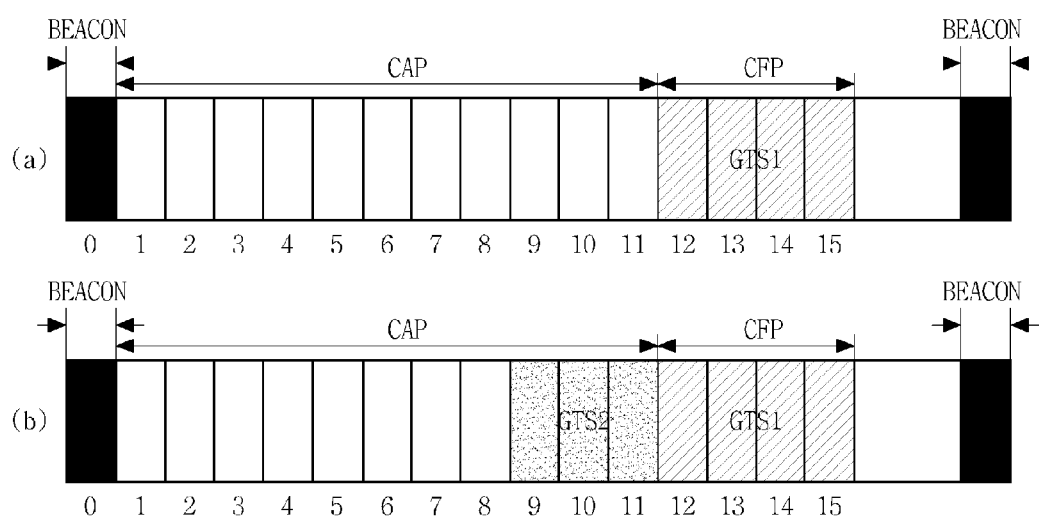
FIG. 5 illustrates the time slot structure of a ZigBee superframe which meets the IEEE 802.15.4 standard and is used to provide a unidirectional 32 Kbps voice service using an acknowledgement (ACK), according to an exemplary embodiment.

FIG. 5 illustrates the time slot structure of a ZigBee superframe which meets the IEEE 802.15.4 standard and is used to provide a unidirectional 32 Kbps voice service using an ACK, according to an exemplary embodiment.

Referring to FIG. 5A, GTS1, which includes four time slots, is allocated to a superframe in order to support a unidirectional 32 Kbps voice service.

Voice Data 62byte+overhead 20 byte=82 byte $t_{ack}$(12symbol=6byte)+ACK(11byte)=17 byte Total 99byte<4slot (120byte)

Referring to FIG. 5B, for data retransmission in the unidirectional 32 Kbps voice service, a retransmission GTS, that is, GTS2, is required in addition to GTS1. Unlike GTS1, GTS2 includes three time slots and is allocated as a retransmission GTS. Here, the number of time slots included in a retransmission GTS is limited to three because an ACK is hardly needed in the retransmission GTS, and a maximum of seven GTS time slots can be allocated according to the IEEE 802.15.4 standard.

Since the IEEE 802.15.4 standard supports data rates of up to 250 Kbps, only a unidirectional service can be provided to retransmit 32 Kbps voice data. However, since the IEEE 802.15.4a standard supports data rates of up to 851 Kbps, data having various streaming characteristics, such as voice, can be transmitted. In addition, a real-time service can be provided between a plurality of terminals, and a plurality of retransmission GTSs can be allocated. Hereinafter, exemplary embodiments of the present invention will be described, bearing in mind that a retransmission GTS is allocated to a plurality of terminals.

Figure 6A:
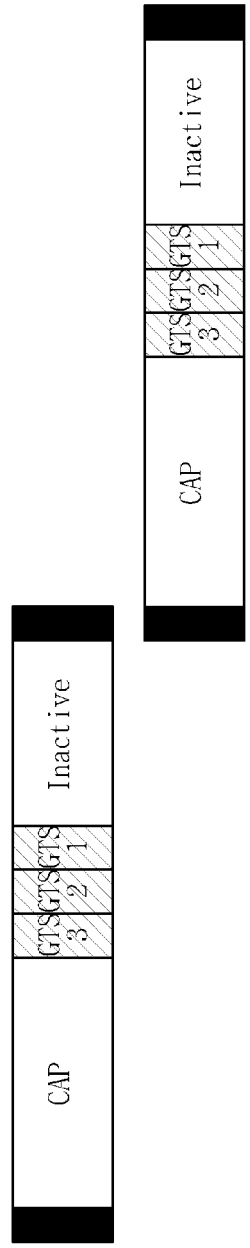
FIGS. 6A to 6C are conceptual diagrams for explaining a method of using a retransmission guaranteed time slot (GTS) according to an exemplary embodiment.
Figure 6B:
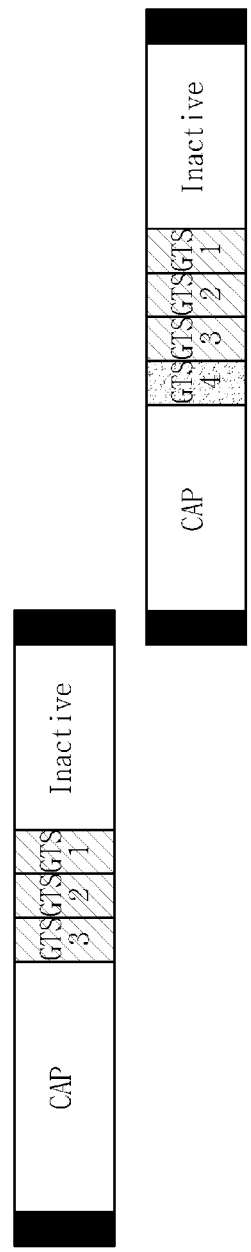
Figure 6C:
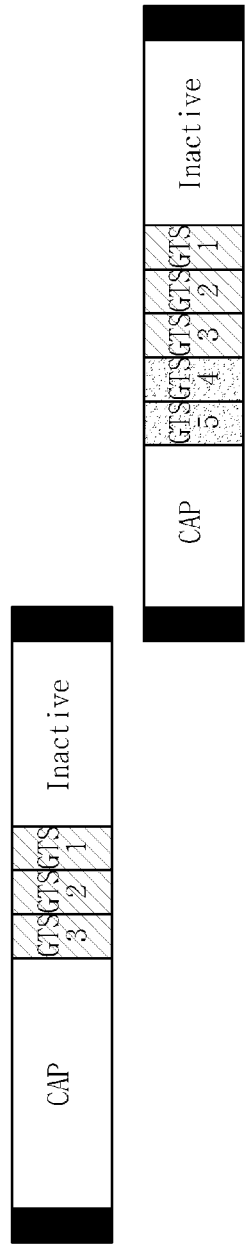

FIGS. 6A to 6C are conceptual diagrams for explaining a method of using a retransmission GTS according to an exemplary embodiment.

GTS1 through GTS3 are included in a first time slot that is used to transmit data in a first superframe, and GTS4 and GTS5 are included in a second time slot that is used to retransmit the data in a second superframe. Referring to FIG. 6A, when no error occurs in all data transmitted is in GTS1 through GTS3 of the first superframe, GTS4 and GTS5 are not allocated to the second superframe. Referring to FIG. 6B, when an error occurs in data transmitted in any one of GTS1 through GTS3 of the first superframe, only one retransmission GTS, that is, GTS4, is allocated to the second superframe. Referring to FIG. 6C, when an error occurs in data transmitted in any two of GTS1 through GTS3 of the first superframe, two retransmission GTSs, that is, GTS4 and GTS5, are allocated to the second superframe.

Information about whether to allocate a retransmission GTS is included in a beacon that is transmitted every superframe, and each terminal identifies whether the retransmission GTS has been allocated thereto based on the beacon. When necessary, a coordinator prioritizes terminals that will be allocated a retransmission GTS, includes a priority list in a beacon, and sends the beacon to the terminals.

The number of GTSs in which data errors occurred may be less than the number of retransmission GTSs that can be allocated to a superframe. In this case, a coordinator allocates retransmission GTSs to the second time slot of the second superframe, up to the number of retransmission GTSs that can be allocated. As a result, some terminals may not be allocated a retransmission GTS in the second time slot of the second superframe. Therefore, for fairness among terminals, a terminal which was not allocated a retransmission GTS in the second superframe may preferentially be allocated a retransmission GTS in a next superframe of the second superframe, so that a delay resulting from data retransmission is within the allowable range that satisfies quality of service.

Figure 7:
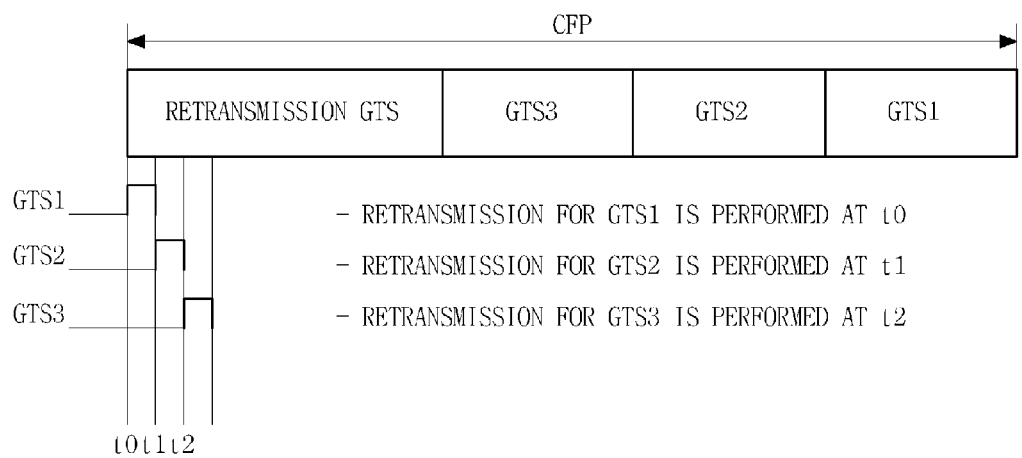
FIG. 7 illustrates the structure of a contention free period (CFP) used to retransmit data according to an exemplary embodiment.

FIG. 7 illustrates the structure of a CFP used to retransmit data according to an exemplary embodiment.

A coordinator exchanges real-time data frames with terminals in its service area in a first superframe and determines whether an error has occurred in any data. When an error has occurred in data, the coordinator sends GTS information for retransmission of the data to the terminals by using a beacon of a second superframe. Here, the coordinator does not inform the terminals of which of the terminals will use a retransmission GTS. In this case, if a plurality of terminals use a retransmission GTS, a collision may occur. To avoid a collision, when two or more terminals intend to use a retransmission GTS, the terminals communicating with the coordinator should use the retransmission GTS based on certain rules.

In an exemplary embodiment, a staged frame and collision avoidance method is used as illustrated in FIG. 7 to allocate GTS time slots to terminals. That is, if terminals are using GTS1 through GTS3, they may use a retransmission GTS at different times, according to a number of a GTS that each of the terminals is using. For example, a terminal using GTS1 may retransmit data at a time t0, and a terminal using GTS2 may retransmit data at a time t1 after the terminal using GTS1 retransmitted the data at time to. In addition, a terminal using GTS3 may retransmit data at a time t2 after the terminal using GTS1 and the terminal using GTS2 retransmitted the data at times t0 and t1, respectively. An appropriate difference between data retransmission times may be several to tens of μs (a unit of bit) in data size.

Figure 8:
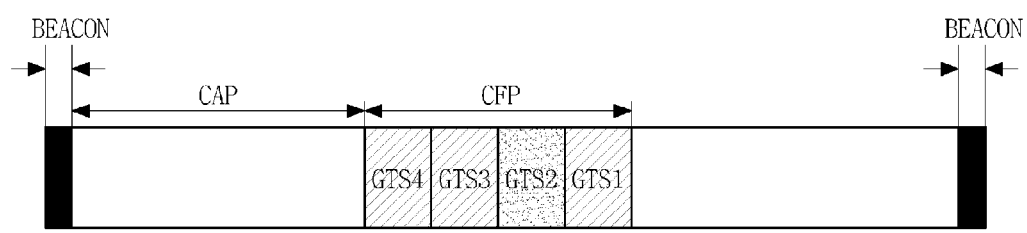
FIG. 8 illustrates the structure of a superframe which meets the IEEE 802.15.4 standard and to which a retransmission GTS has been allocated, according to an exemplary embodiment.

FIG. 8 illustrates the structure of a superframe which meets the IEEE 802.15.4 standard and to which a retransmission GTS has been allocated, according to an exemplary embodiment.

GTS1, GTS3, and GTS4 are included in a first time slot, and GTS2 is included in a second time slot. FIG. 8 shows the GTS allocation state of a second superframe based on the assumption that an error occurred in GTS1. In the IEEE 802.15.4 standard, a terminal is allocated one transmission GTS and one reception GTS. Therefore, any additional GTS must be allocated to be successive to a previously allocated GTS. As illustrated in FIG. 8, GTS1 and GTS2, which is a retransmission GTS, should be combined as a single GTS and allocated accordingly to a terminal.

Figure 9:
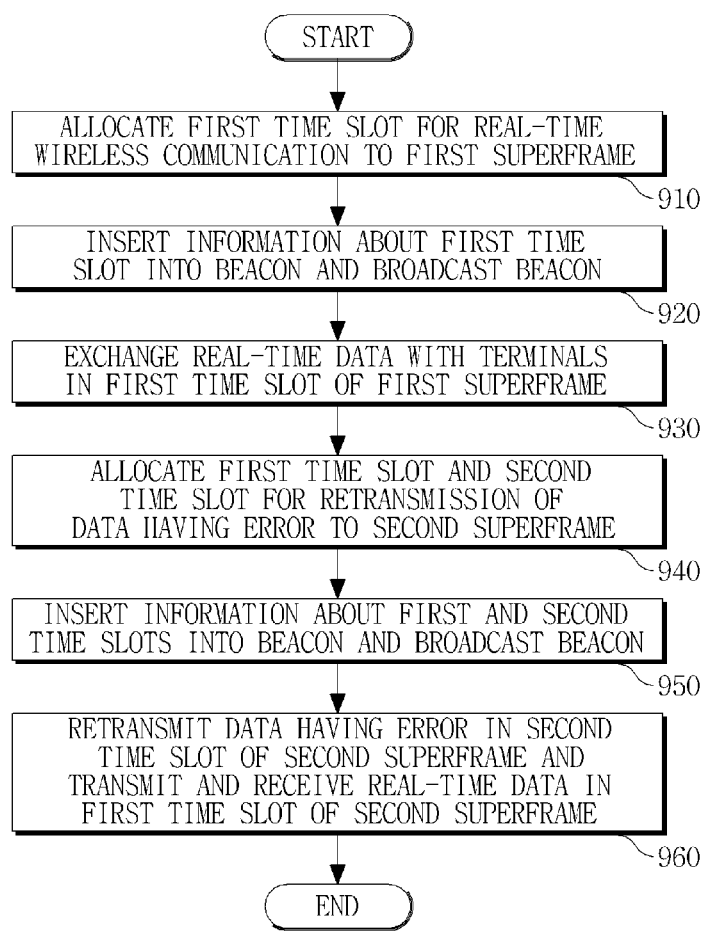
FIG. 9 is a flowchart illustrating a real-time wireless communication method used by a coordinator in a WPAN to guarantee quality of service, according to an exemplary embodiment.

FIG. 9 is a flowchart illustrating a real-time wireless communication method used by a coordinator in a WPAN to guarantee quality of service, according to an exemplary embodiment.

Referring to FIG. 9, a coordinator allocates a first time slot for real-time wireless communication with at least one of a plurality of terminals to a first superframe (operation 910). Then, the coordinator inserts information about the first time slot of the first superframe into a beacon and broadcasts the beacon (operation 920). Next, the coordinator exchanges real-time data (e.g., voice data for a voice communication service) with each of the terminals, which receive the beacon, in a corresponding GTS of the first time slot (operation 930). If an error occurred in data transmitted or received in the first time slot in operation 930, that is, if a NACK was received or transmitted to/from a terminal, the coordinator allocates to a second superframe a first time slot and a second time slot for retransmitting and/or re-receiving the data having the error (operation 940). Conversely, if an ACK is received, the second time slot is not allocated.

After operation 940, the coordinator inserts information about the first and second time slots of the second superframe into a beacon and broadcasts the beacon (operation 950). Then, the coordinator retransmits and/or re-receives the data having the error in the second time slot of the second superframe and transmits and receives real-time data in the first time slot of the s second superframe (operation 960). Subsequent operations will be continued until the end of the real-time communication. However, for convenience of description, operations only in the first and second superframes are illustrated in FIG. 9.

According to an additional aspect of the present invention, the coordinator stores data, which was transmitted in the first time slot of the first superframe, in a memory. Then, the coordinator removes the stored data when receiving an ACK and retransmits the stored data in the second time slot of the second superframe when receiving a NACK. In this situation, there is not enough time to exchange internal messages at a next upper layer in order to retransmit data. Thus, after data is transmitted at the MAC layer, it is stored until an ACK is received. Then, the stored data is removed when an ACK is received, and retransmitted when a NACK is received.

Figure 10:
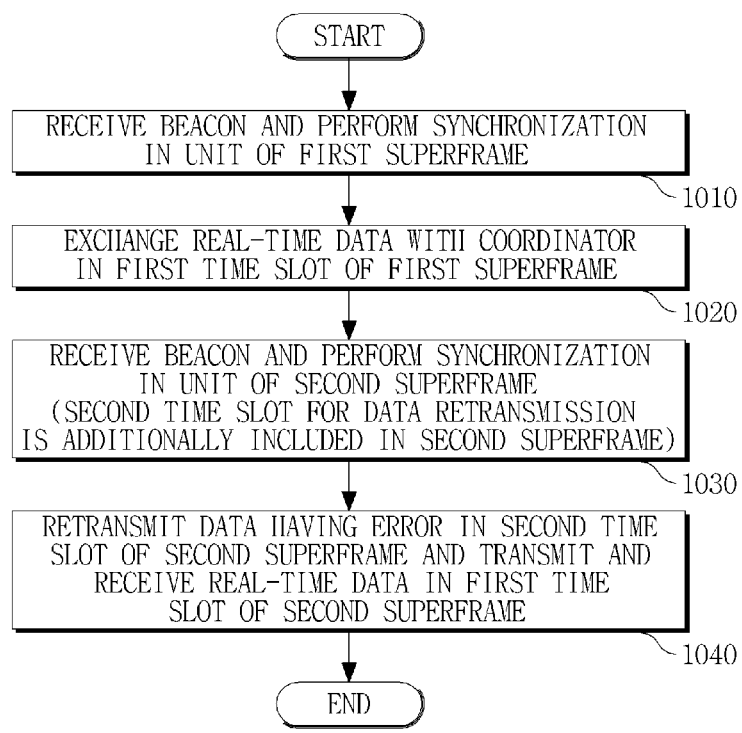
FIG. 10 is a flowchart illustrating a real-time wireless communication method used by a terminal, which is not a coordinator, in a WPAN to guarantee quality of service, according to an exemplary embodiment.

FIG. 10 is a flowchart illustrating a real-time wireless communication method used by a terminal, which is not a coordinator, in a WPAN to guarantee quality of service, according to an exemplary embodiment.

Referring to FIG. 10, a terminal receives a beacon for a first superframe from a coordinator and performs synchronization in unit of the first superframe using the received beacon (operation 1010). The terminal exchanges real-time data with the coordinator in a GTS of a first time slot of the first superframe which is allocated thereto (operation 1010). Subsequent operations are performed based on the assumption that an error occurred in data transmitted or received in the first time slot of the first superframe, that is, based on the assumption that a NACK was received or transmitted from/to the coordinator. Next, the terminal receives a beacon for a second superframe from the coordinator and performs synchronization in unit of the second superframe using the received beacon (operation 1020). Then, the terminal retransmits and/or re-receives data having an error in a second time slot of the second superframe, and transmits and receives real-time data in a first time slot of the second superframe (operation 1030). Subsequent operations will be continued until the end of the real-time communication. However, for convenience of description, operations only in the first and second superframes are illustrated in FIG. 10.

In the cases when the data has an error and when the data does not have an error, a coordinator and a terminal, which is not a coordinator, process data, which is received in a first time slot of a first superframe, as follows:

When data has no error

When data is received in a first time slot of a first superframe, it is stored in a memory without decoding. Then, when data is received in a first time slot of a second superframe, it is stored in the memory while the data previously stored in the memory is decoded and output. That is, when data is received in a current superframe, it is stored in the memory for a period of time. Then, the stored data is decoded and output in a next superframe. If the data is voice data, it is decoded and then output through a speaker.

② When data has an error

When data received in a first time slot of a first superframe is erroneous, it is removed without being stored in a memory. Then, data, which was successfully received in a superframe immediately before the first superframe, is read from the memory and decoded and output. To re-receive data having an error, a second time slot is allocated to a second superframe. Accordingly, the data having the error is re-received in the second time slot of the second superframe, and next data of the data having the error is received in a first time slot of the second superframe. Here, the data received in the second time slot of the second superframe is not stored in the memory but is immediately decoded and output. In addition, the data received in the first time slot of the second superframe is stored in the memory and then decoded and output in a next superframe of the second superframe.

As apparent from the above description, when data transmitted in a current superframe has an error, it is retransmitted in a next superframe. This not only guarantees quality of service but also ensures time diversity, which in turn, increases resistance to channel errors. In addition, a delay resulting from data retransmission is limited to one frame or less.

After data is transmitted at a MAC layer, it is stored until an ACK is received. Then, the stored data is removed when an ACK is received, and retransmitted when a NACK is received. In this way, data retransmission can be quickly processed.

When a plurality of terminal use a real-time communication service, if errors simultaneously occur in one or more GTSs, retransmission GTSs are allocated up to the number of retransmission GTSs that can be allocated, and data having an error is retransmitted in the allocated retransmission GTSs. In addition, a terminal which was not allocated a retransmission GTS in a current superframe is preferentially allocated a retransmission GTS in a next superframe, so that a delay resulting from data retransmission is within the allowable range.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A real-time wireless communication method used by a terminal, which is designated as being a coordinator from among a plurality of terminals in a wireless personal area network (WPAN), the method to guarantee quality of service, and the method comprising:

a first superframe communication operation of allocating a first time slot for real-time wireless communication with at least one of the terminals to a first superframe, inserting information about the first time slot into a beacon and broadcasting the beacon, and exchanging data with the terminals in the first time slot of the first superframe; and a second superframe communication operation of allocating a first time slot to a second superframe which is successive to the first superframe, additionally allocating, when data transmitted or received in the first time slot of the first superframe has an error, a second time slot to the second superframe so as to retransmit or re-receive the data having the error, inserting information about the first time slot and the second time slot into a beacon and broadcasting the beacon, and retransmitting or re-receiving the data having the error in the second time slot of the second superframe.

2. The method of claim 1, further comprising:

storing data transmitted in the first time slot of the first superframe in the first superframe communication operation; and removing the stored data when a positive acknowledgement is received for the data transmitted in the first time slot of the first superframe.

3. The method of claim 2, wherein in the second superframe communication operation, the stored data is retransmitted in the second time slot of the second superframe when a negative acknowledgement is received for the data transmitted in the first time slot of the first superframe.

4. The method of claim 1, wherein in the second superframe communication operation, when the number of time slots that need to be allocated to the second time slot exceeds the number of times slots that can be allocated, time slots are allocated up to the number of time slots that can be allocated.

5. The method of claim 4, wherein in the second superframe communication operation, information about terminals which will use time slots of the second time slot is included in a beacon and broadcast accordingly.

6. The method of claim 4, further comprising allocating a time slot of a second time slot preferentially to a terminal, which was not allocated a time slot of the second time slot in the second superframe communication operation, in a next superframe of the second superframe.

7. The method of claim 1, further comprising storing data received in the first time slot of the first superframe in a memory when the data does not have an error and decoding and outputting the stored data in the second superframe.

8. The method of claim 7, further comprising removing the data received in the first time slot of the first superframe when the data has an error.

9. The method of claim 8, further comprising immediately decoding and outputting data received in the second time slot of the second superframe without storing the data in the memory.

10. The method of claim 1, wherein one of the first time slot and the second time slot comprises a time slot for real-time data transmission and a time slot for real-time data reception.

11. The method of claim 10, wherein a length of each of the first and second superframes is 15.36 ms, and the time slot for real-time data transmission and the time slot for real-time data reception are allocated to each terminal within the duration of each of the first and second superframes.

12. The method of claim 1, wherein the WPAN is a low-rate WPAN based on an Institute of Electrical and Electronics Engineers (IEEE) 802.15.4 standard.

13. A real-time wireless communication method used by any one of a plurality of terminals in a WPAN, which is not designated as being a coordinator, the method to guarantee quality of service, and the method comprising:
   a first superframe communication operation of exchanging real-time data with the coordinator in a first time slot which was allocated by the coordinator to a first superframe; and
   a second superframe communication operation of, when real-time data transmitted or received in the first time slot of the first superframe has an error, retransmitting or re-receiving the real-time data having the error in a second time slot which was additionally allocated by the coordinator to a second superframe that is successive to the first superframe.

14. The method of claim 13, further comprising:
   storing data transmitted in the first time slot of the first superframe in the first superframe communication operation; and
   removing the stored data when a positive acknowledgement is received for the data transmitted in the first time slot of the first superframe.

15. The method of claim 14, wherein in the second superframe communication operation, the stored data is retransmitted to the coordinator in the second time slot of the second superframe when a negative acknowledgement is received for the data transmitted in the first time slot of the first superframe.

16. The method of claim 13, further storing data received in the first time slot of the first superframe in a memory when the data does not have an error and decoding and outputting the stored data in the second superframe.

17. The method of claim 16, further comprising removing the data received in the first time slot of the first superframe when the data has an error.

18. The method of claim 17, further comprising immediately decoding and outputting data received in the second time slot of the second superframe without storing the data in the memory.

19. The method of claim 13, wherein one of the first time slot and the second time slot comprises a time slot for real-time data transmission and a time slot for real-time data reception.

20. The method of claim 13, wherein the WPAN is a low-rate WPAN based on an IEEE 802.15.4 standard.

* * * * *